(12) United States Patent
Nakamura et al.

(10) Patent No.: US 7,311,995 B2
(45) Date of Patent: Dec. 25, 2007

(54) ELECTROCHEMICAL CELL

(75) Inventors: Yoshibumi Nakamura, Miyagi (JP); Kensuke Tahara, Miyagi (JP); Shunji Watanabe, Miyagi (JP); Tsugio Sakai, Miyagi (JP); Hideharu Onodera, Miyagi (JP)

(73) Assignee: SII Micro Parts Ltd. (JP)

( * ) Notice: Subject to any disclaimer, the term of this patent is extended or adjusted under 35 U.S.C. 154(b) by 431 days.

(21) Appl. No.: 10/844,290

(22) Filed: May 12, 2004

(65) Prior Publication Data
US 2004/0241542 A1 Dec. 2, 2004

(30) Foreign Application Priority Data
May 20, 2003 (JP) ............... 2003-154392

(51) Int. Cl.
*H01M 2/08* (2006.01)
(52) U.S. Cl. ..................................... 429/185
(58) Field of Classification Search ................ 429/181, 429/185, 184
See application file for complete search history.

(56) References Cited

U.S. PATENT DOCUMENTS 5,009,357 A * 4/1991 Baker et al. ............. 228/122.1
6,445,566 B2 * 9/2002 Watanabe et al. ........... 361/502

OTHER PUBLICATIONS

Electronic Space Products International (ESP!), "KOVAR", http://www.espi-metals.com, 4 pages, 2002.*

* cited by examiner

*Primary Examiner*—Patrick Joseph Ryan
*Assistant Examiner*—Thomas H. Parsons
(74) *Attorney, Agent, or Firm*—Adams & Wilks

(57) ABSTRACT

An electrochemical cell has an outer case formed of one of ceramics and glass. An electrochemical cell element is hermetically sealed in the outer case. The electrochemical cell element contains a positive pole, a negative pole, and a non-aqueous electrolyte containing an organic solvent. A metal layer is formed on an edge of the outer case. A sealing plate is resistance welded to the metal layer. The sealing plate is made of an alloy containing, in weight percentage, Co by 1 to 50%, Ni by 1 to 70%, Fe by 20% or higher, Cr by 10% or lower, Mn by 2.0% or lower, Si by 1.0% or lower and C by 1.0% or lower.

14 Claims, 2 Drawing Sheets

ELECTROCHEMICAL CELL

BACKGROUND OF THE INVENTION

1. Field of the Invention

The present invention relates to an electrochemical cell having a power generating function or an electricity accumulating function such as a non-aqueous electrolyte battery or an electric double layer capacitor, and more particularly to an electrochemical cell of chip type adapted for surface mounting.

2. Description of the Background Art

An electrochemical cell such as a non-aqueous electrolyte battery or an electric double layer capacitor has been employed as a backup power supply for a clock device or a semiconductor memory, a reserve power supply of an electronic apparatus constituted of a microcomputer, an IC memory etc., or a power supply of a control circuit for a solar clock or for motor driving. Recently, the electrochemical cell has been investigated also as a power supply for an electric automobile and an auxiliary power accumulating unit for an energy conversion/storage unit.

With an increase in the density of component mounting for realizing smaller, lighter and more functional devices, a smaller and thinner structure is also requested for the electrochemical cell which is used as a power source for such devices. In a prior electrochemical cell of coin or button type, a metal case 401 and a metal cover 402 constituting the outer casing of the cell as shown in FIG. 4 serve also as terminals for electrical connection with an external circuit. Since such metal case 401 and metal cover 402 constituting the terminals are positioned above and below, it is common to weld a lead tab terminal A 403 and a lead tab terminal B 404 respectively to the case and the cover in advance and to solder the lead tab terminals to a circuit board. Therefore, an increased number of components including such lead tab terminals results in an increase in the number of production steps, thus leading to an increased cost, and a size reduction has been difficult because spaces are necessary for the terminals on the cell and the board.

For this reason, it has been investigated, in a structure of an external member for housing the electrical double layer capacitor element of a surface mounting type, to contact metal terminal plates with an insulating ring-shaped frame across a solder material so as to close the aperture of the frame and to irradiate a portion where the outer frame and the metal terminal plates are opposed across the solder material with a laser beam thereby adjoining the outer frame and the terminal plates (for example cf. patent reference 1). Also, it has been investigated, in the aforementioned configuration, to utilize Ni or stainless steel having a thermal expansion coefficient and a thermal conductivity close to those of alumina for the metal terminal plates thereby preventing a thermal strain (for example cf. patent reference 1).

[Patent Reference 1] JP-A-08-339943 (Page 2, FIG. 2)

However, though the configuration in the patent reference 1 can increase an effective space in the battery in comparison with a configuration of coin type, it is still associated with a drawback of requiring lead tab terminals for the electrical connection with the external circuit, since metal terminal plates serving also as external cases are positioned above and below also in this case.

Also, even in case of employing Ni in the metal terminals, heat generated by the laser beam irradiation causes a thermal expansion and a contraction, because of the thermal expansion coefficient ($13 \times 10^{-6}/°$ C.) of Ni, thereby generating a distortion in the sealed aperture portion, whereby a sufficiently tight sealing cannot be obtained. Therefore, an internal resistance, a capacitance and a prolonged reliability cannot be realized with a sufficient level.

In the non-aqueous electrolyte battery and the electric double layer capacitor, for adhering and sealing an external case with a sealing plate, there can be employed, for example, a method of utilizing an adhesive, a soldering method, a caulking method or a fusing method. On the other hand, since the non-aqueous electrolyte battery or the electric double layer capacitor contains an electrolyte liquid therein and a high voltage is applied to current collecting members, a highly hermetic sealing is required for preventing anodic or cathodic corrosion of the positive and negative current collecting members and ensuring prolonged reliability. In fact there has been a difficulty in selecting a material for the sealing plate and a sealing method, in order to satisfy battery charactgeristics and sealing characteristics. For example, in case of sealing by providing an adjoining material or a adhesive material such as a solder at the edge of the outer casing, placing a sealing plate on such material and heating at a temperature equal to or higher than the melting point of the solder or at a hardening temperature of the adhesive material, the electrolyte in the outer casing is heated and evaporates to the exterior whereby the capacity of the battery is lost and a sufficient sealing cannot be attained.

Also in case of executing a resistance welding of a caulked portion for a highly reliable sealing or a laser or beam welding which is a fusing method, utilizing a sealing plate of a material resistant to cathodic corrosion (such as aluminum, stainless steel or nickel), a welded part of the sealing plate and the edge portion of the outer case assumes a high temperature, thereby generating a mechanical distortion in the sealed part since the material of such sealing plate shows a large thermal expansion. Also by the heat at the welding, a thermal expansion of the electrolyte increases the internal pressure, thereby eventually leading to a liquid leakage from the distorted part of the sealing. In this manner there have been experienced drawbacks of a loss in the capacity or a loss in the prolonged reliability.

SUMMARY OF THE INVENTION

For solving these drawbacks, an electrochemical cell of the present invention employs a structure of sealing an outer case of a ceramic or glass material with a sealing plate, wherein the sealing plate is constituted of a single metal member serving also as a negative pole current-collecting member, or a metal or an insulating member provided at least on a surface thereof with a metal layer constituting a negative pole current-collecting member, and the negative pole current-collecting member is formed by an alloy containing, in weight percentage (wt. %), Co by 1 to 50%, Ni by 1 to 70%, Fe by 20% or higher, Cr by 10% or lower, Mn by 2.0% or lower, Si by 1.0% or lower and C by 1.0% or lower.

The metal of such alloy composition allows to obtain a sealing plate showing a very little deterioration resulting from a cathodic corrosion of the negative pole current-collecting member at a charging or an overcharging of an electrochemical cell and having a low thermal expansion coefficient, and a seam welding with a resistance welding method allows to obtain a highly reliable electrochemical cell without a defect in the sealing such as a crack or a distortion in the sealed part, resulting from a thermal expansion and a contraction of the sealing plate at the sealing operation.

Further, the electrochemical cell of the present invention is formed by sealing an electrochemical cell element, including a pair of electrodes containing a positive pole and a negative pole and a non-aqueous electrolyte, with an external case and a sealing plate, wherein the external case is formed by a ceramic or glass material while the sealing plate is formed by a metal plate serving also as a negative pole current-collecting member or a metal or an insulating member provided, at least on a surface thereof, with a metal layer constituting a negative pole current-collecting layer, and the negative pole current-collecting member is formed by a material of a thermal expansion coefficient approximately same as that of the outer case.

Alternatively, the electrochemical cell is formed by sealing an electrochemical cell element, including a pair of electrodes containing a positive pole and a negative pole and a non-aqueous electrolyte, with an external case and a sealing plate, wherein the sealing plate is formed by a metal plate serving also as a negative pole current-collecting member or a metal or an insulating member provided, at least on a surface thereof, with a metal layer constituting a negative pole current-collecting layer, and the negative pole current-collecting member is formed by an alloy containing, in weight percentage (wt. %), Co by 1 to 50%, Ni by 1 to 70%, Fe by 20% or higher, Cr by 10% or lower, Mn by 2.0% or lower, Si by 1.0% or lower and C by 1.0% or lower.

Furthermore, the outer case is formed by ceramics or glass. Also the negative pole current-collecting member is formed by an alloy with a thermal expansion coefficient of −2 to $11 \times 10^{-6}$/° C. (0-300° C.).

Furthermore, the alloy employed in the negative pole current-collecting member is plated with at least one of Ni, Au, W and Cr, and the sealing is achieved by adjoining the outer case and the sealing plate by resistance welding.

Furthermore, a solder material is provided on the plating, and the sealing is achieved by adjoining the outer case and the sealing plate by resistance welding. Also the solder material is provided by a thick film method utilizing a plating method or a printing method.

Furthermore, a conductive layer electrically connected with either of the positive pole and the negative pole is provided and a connecting terminal, electrically connected with the conductive layer is formed by a patterning on an external surface of the outer case.

DETAILED DESCRIPTION OF THE PREFERRED EMBODIMENTS

Figure 1:
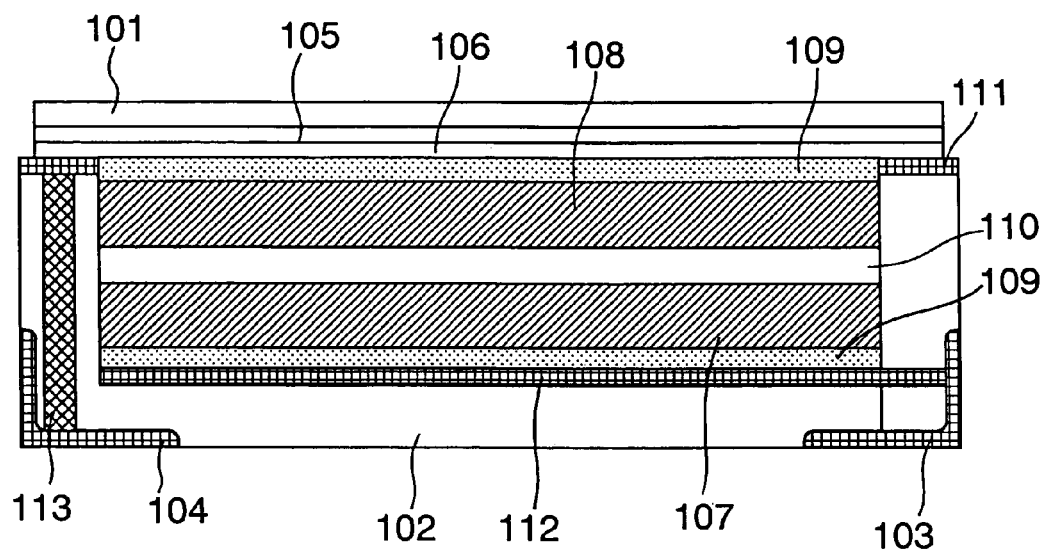
FIG. 1 is a cross-sectional view showing an electrochemical cell of the present invention.

A representative structure of the electrochemical cell of the present invention will be explained with reference to FIG. 1. A sealing plate 101 serves also as a negative pole current-collecting member, and is constituted of an alloy of a composition containing, in weight percentage (wt. %), Co in 1 to 50%, Ni in 1 to 70%, Fe in 20% or higher, Cr in 10% or lower, Mn in 2.0% or lower, Si in 1.0% or lower and C in 1.0% or lower. Such composition realizes uniform crystal grains, and reduces a cathodic corrosion resulting from a grain boundary corrosion. Also depending on the composition ratio, it is possible to achieve an improvement in a high-temperature strength, an optimization in the thermal expansion coefficient and an improvement in oxidation resistance and thin plate working property. Also the negative pole current-collecting member employs a material having a thermal expansion coefficient comparable to that of the outer case 102. Such configuration relaxes a distortion of the sealed part at the resistance welding, thereby enabling a highly reliable sealing and preventing a liquid leakage or an intrusion of moisture from the exterior. For example, in case the outer case 102 is formed by a ceramic or glass material, a material having a thermal expansion coefficient of −2 to $11 \times 10^{-6}$/° C. (0-300° C.) is employed for the negative pole current-collecting member.

Furthermore, the sealing plate 101 is given a Ni plating 105 which is resistance welded to an Au or Ni metallized layer 111 provided in an adjoining part of the outer case. Instead of Ni plating, a plating of Au, W or Cr may also be employed. It is also possible to further improve the adhesion of resistance welding by providing, on such metal plating, a solder material 106 such as Ag—Cu, Ni solder or Al solder by a thick film process utilizing a plating method or a printing method.

As explained in the foregoing, the outer case 102 is preferably formed by a heat resistant material such as glass, ceramics or ceramic glass, and desirably has a thermal expansion coefficient close to that of the sealing plate. In particular, an outer case of ceramics is preferred as it can easily achieve a thin structure because of its high strength and insulating property, and alumina is particularly superior in the strength and the thermal expansion.

In positioning a positive pole pellet 107 in the outer case 102, it is preferable, in order to decrease an internal resistance of the electrochemical cell, to constitute an entire internal bottom face of the outer case 102 as a positive pole current-collecting member thereby increasing the contact with the positive pole pellet 107. A wiring to the positive pole current-collecting member is made by electrically connecting a conductive pattern A 112, penetrating through a wall of the outer case, to a connecting terminal A 103, and a wiring to the negative pole current-collecting member is made by electrically connecting a conductive pattern B 113, penetrating from an upper face of the outer case to the interior of a lateral face, to a connecting terminal B 104. In such configuration, connecting leads of the positive and negative poles for connection with an external circuit are formed by patterns formed by plating or sintering on the outer case, whereby the connecting terminals can be directly patterned on the bottom surface of the outer case to realize a small and thin configuration without requiring a mounting of tab terminals or the like.

Also active materials constituted of a positive pole pellet 107 and a negative pole pellet 108 are adhered with a conductive adhesive 109, containing carbon as a conductive filler. The positive pole pellet 107 or the negative pole pellet 108 need not necessarily be adhered to the current-collecting member but may be so placed on the current-collecting member as to make an electrical connection.

In case of constructing the electrochemical cell as a power generating element such as a non-aqueous electrolyte battery, an active material of the positive pole pellet 107 can be constituted of various materials capable of storing and releasing lithium ions and anions, for example a metal chalcogenide such as $TiS_2$, $MoS_2$ or $NbSe_3$, a metal oxide such as $MnO_2$, $MoO_3$, $V_2O_5$, $Li_xCoO_2$, $Li_xNiO_2$, or $Li_xMn_2O_4$, a conductive polymer such as polyaniline, polypyrrole, polyparaphenylene or polyacene, or a graphite interlayer compound. An active material of the negative pole pellet 108 is not particularly restricted, and can be constituted of various materials such as SiO, $WO_2$, $WO_3$, SnO or LiAl.

In case the electrochemical cell constitutes an electrical double layer capacitor, the active material of the positive pole pellet can be constituted of active charcoal or active carbon fibers. A separator 110 to be used is preferably a heat-resistant non-woven cloth free from a dissolution into the non-aqueous electrolyte or a deterioration by a chemical reaction. For example, a separator formed by a polyolefin microporous film is stable against dissolution into the non-aqueous electrolyte or deterioration by corrosion, but is insufficient in the heat resistance, as it shrinks in its extending direction by the heat of seam welding utilizing the resistance welding method, thereby resulting in an internal shortcircuiting. A separator utilizing a heat-resistant resin such as PPS or PEEK or glass fibers is free from such shrinkage and provides a satisfactory result. Also a porous ceramic material may be employed for this purpose.

An electrolyte liquid may be formed by dissolving lithium hexafluorophosphate, lithium borofluoride, lithium trifluoromethanesulfonate, lithium perfluoroethylsulfonylaimide, $(C_2H_5)_4PBF_4$, $(C_3H_7)_4PBF_4$, $(CH_3)(C_2H_5)_3NBF_4$, $(C_2H_5)_4NBF_4$, $(C_2H_5)_4PPF_6$, $(C_2H_5)_4PCF_3SO_4$, or $(C_2H_5)_4NPF_6$ by 0.1 to 3.0 moles in a single or mixed organic solvent such as of propylene carbonate, butylenes carbonate, sulforan, ?-butyrolactone, ethylene carbonate, acetonitrile, dimethoxyethane or methyl formate.

After the positive pole pellet 107, the negative pole pellet 108, the separator 110 and the electrolyte liquid were placed in the interior of the outer case which was then covered with the sealing plate 101, a parallel seam welding apparatus utilizing the principle of resistance welding was employed to press roller-shaped electrodes on opposed two sides and to apply a current thereby temporarily fixing the sealing plate 101 to the outer case 102 by spot welding, and then to execute welding on every two sides at a time. In this manner a highly reliable sealing was obtained.

In the welding in the presence of contents of the electrochemical cell, a seam welding utilizing the resistance welding method was particularly preferable. For example a laser welding cannot provide an appropriate welding as the materials present in the outer case 102 push up the sealing plate 101 whereby the sealing plate 101 becomes separated from the welded part of the outer case 102. On the other hand, in the seam welding, the roller-shaped electrodes press down the sealing plate 101 to realize a close contact of the sealing plate 101 of the welding part with the welded part of the outer case 102, thereby providing a highly reliable sealing.

Figure 3:
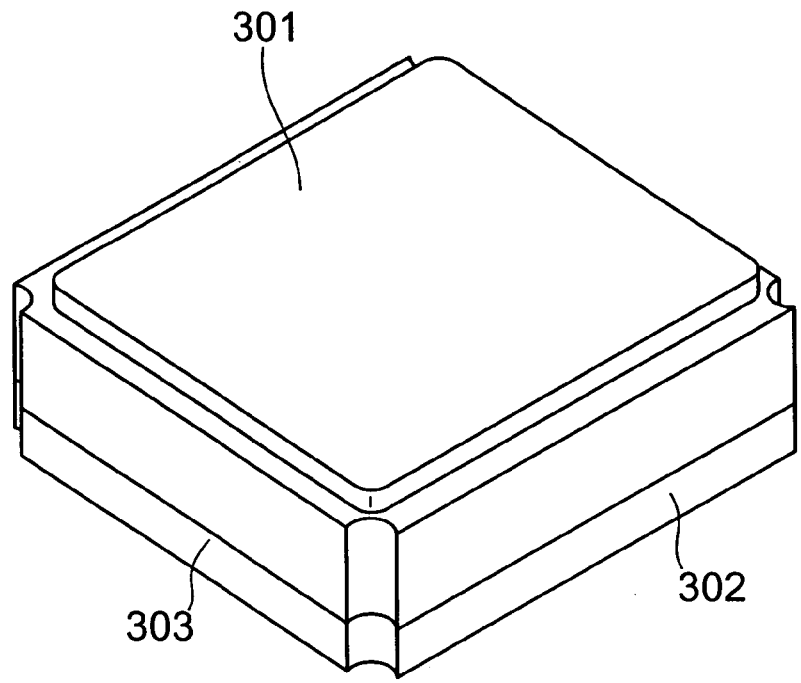
FIG. 3 is a view showing an electrochemical cell of the present invention.

A perspective-view of an electrochemical cell concerning the present invention is shown in FIG. 3. The electrochemical cell is a rectangular shape. An outer case 302 contains an electrode, a separator, and an electrolyte liquid. A sealing is achieved by welding the outer case 302 and a sealing plate 301. And, a connecting terminal 303 which is formed on the outer case 302 connects with an external circuit.

Figure 4:
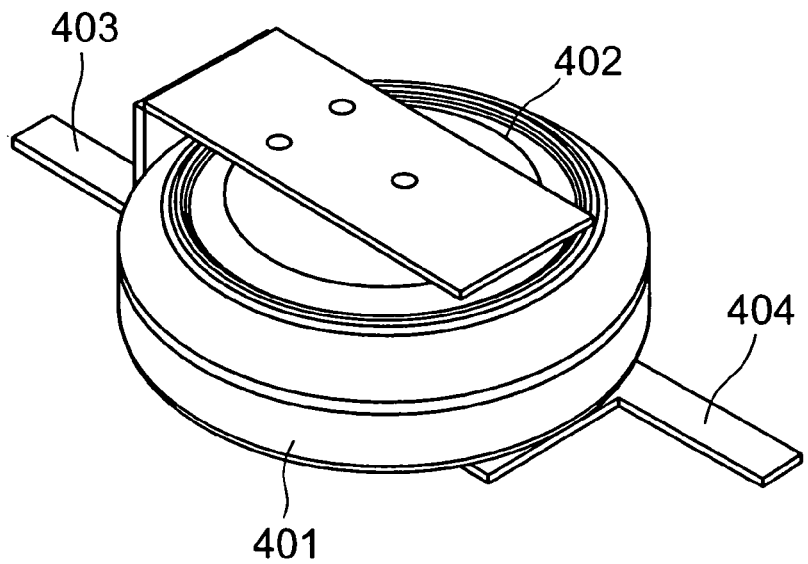
FIG. 4 is a view showing a prior electrochemical cell.

In the invention, the non-aqueous electrolyte battery or the electrical double layer capacitor basically has an arbitrary shape. A prior electrical double layer capacitor utilizing a caulked sealing as shown in FIG. 4 is substantially limited to a circular shape. Therefore, such device generates a wasted dead space when it is mounted on a same circuit board in combination with other electronic parts which are mostly rectangular. The non-aqueous electrolyte battery or the electrical double layer capacitor of the invention can also be designed in a rectangular shape and has no protruding parts such as terminals, so that it can be made compact and can be efficiently arranged on the circuit board. Therefore, the non-aqueous electrolyte battery and the electrical double layer capacitor constructed as explained in the foregoing constitute an electrochemical cell scarcely associated with corrosion and excellent in reliability.

EXAMPLES

In the following, examples will be explained with reference to accompanying drawings.

Example 1

As shown in FIG. 1 on an entire bottom surface of an outer case 102 (width 7 mm×depth 5 mm×height 0.9 mm) of alumina having a thermal expansion coefficient of $6.8 \times 10^{-6}/°$ C. (0-300° C.), a conductive adhesive 109 containing carbon as a conductive filler was coated, and a positive pole pellet 107 (width 5 mm×depth 3.2 mm×height 0.3 mm) employing lithium-containing manganese oxide as an active material was adhered. Then a separator 110 (width 5.3 mm×depth 3.5 mm×height 0.1 mm) formed by a non-woven cloth of glass fibers was placed thereon to constitute a positive pole unit. Separately, a sealing plate 101 (width 6.5 mm×depth 4.5 mm×height 0.1 mm) serving also as a negative pole current-collecting member and constituted of a covar alloy, containing Co by 16%, Ni by 30%, Mn by 0.3%, Si by 0.1%, C by 0.1% and Fe in the remainder and having a thermal expansion coefficient of $5 \times 10^{-6}/°$ C. (0-300° C.), was given a Ni plating 105 and further provided with Ag—Cu as a solder material 106. On such negative pole current-collecting member, a negative pole pellet 108 (width 5 mm×depth 3 mm×height 0.1 mm) utilizing silicon oxide SiO as the active material was adhered with a conductive adhesive 109 containing carbon as a conductive filler, and lithium (width 5 mm×depth 3.2 mm×height 0.1 mm) was further applied to complete a negative pole unit. In each of the positive pole unit and the negative pole unit, there was poured an electrolyte liquid formed by dissolving lithium perchlorate ($LiClO_4$) as a supporting salt of a concentration of 1 M in a 1:1:2 mixed solvent of propylene carbonate (PC), ethylene carbonate (EC) and dimethoxyethane (DME). Thereafter the positive pole unit and the negative pole unit were integrated, and a peripheral part of the sealing plate was welded and sealed under a pressure applied by roller-shaped welding electrodes of a seam welding apparatus, whereby a non-aqueous electrolyte battery was completed.

Comparative Example 1

A non-aqueous electrolyte battery was prepared in the same manner as in Example 1, except that the material constituting the negative pole current-collecting member was changed from the covar alloy to SUS 304 of a thermal expansion coefficient of $17.3 \times 10^{-6}/°$ C. (0-300° C.). After the non-aqueous electrolyte batteries thus prepared were aged for about one week at the room temperature, a charge-discharge test was conducted to confirm a charge-discharge capacity. Also measurements were made on the capacity and the internal resistance after these non-aqueous electrolyte batteries were stored for 100 days at 60° C. under an application of a voltage of 3.3 V. Results of a rate of capacity deterioration from the initial capacity, an internal resistance and an appearance inspection were summarized in Table 1.

Example 2

Figure 2:
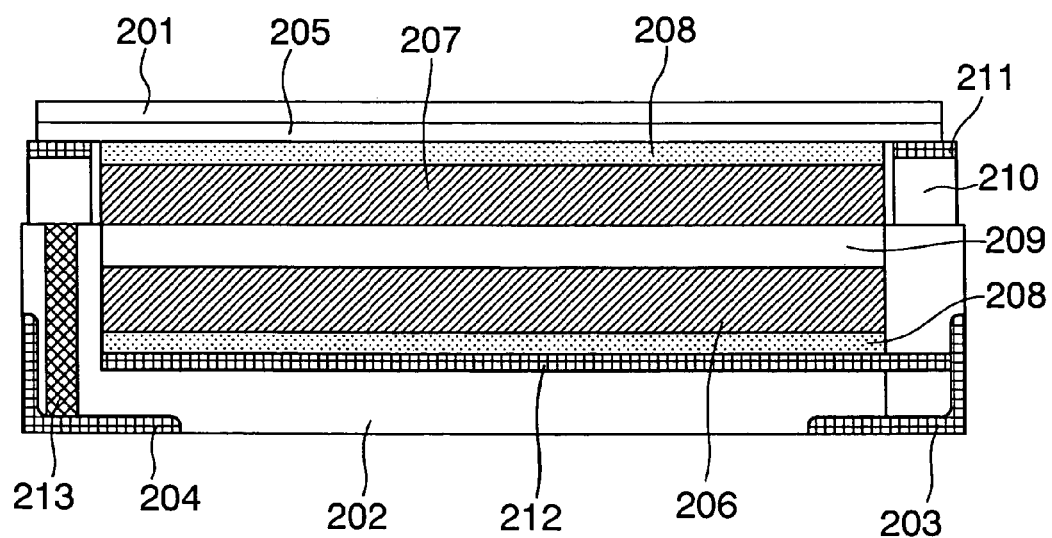
FIG. 2 is a cross-sectional view showing an electrochemical cell utilizing an outer case with a metal ring of the present invention.

In this example, a non-aqueous electrolyte battery of a configuration shown in FIG. 2 was prepared.

In order to improve the adhesion at the resistance welding, a metal ring 210 was placed on an outer case 202 as shown in FIG. 2. By employing a same composition for the outer case 202 and the metal ring 210 to attain a same thermal expansion coefficient, it is possible to eliminate a distortion at the sealed part at the resistance welding operation, thereby enabling a stable welding, but the metal ring 210 and the active material of the positive pole pellet 206 are positioned close thereby leading to a shortcircuiting. On an entire bottom surface of an outer case 202 (width 5 mm×depth 3.2 mm×height 0.6 mm) of alumina having a thermal expansion coefficient of $6.8 \times 10^{-6}/°$ C. (0-300° C.), a conductive adhesive 208 containing carbon as a conductive filler was coated, then a positive pole pellet 206 (width 3.8 mm×depth 2.0 mm×height 0.15 mm) employing active charcoal as a positive pole active material was adhered, and a separator 209 (width 3.9 mm×depth 2.1 mm×height 0.05 mm) formed by a non-woven cloth of glass fibers was placed thereon to constitute a positive pole unit. Also a metal ring 210 constituted of a covar alloy was provided on an external periphery of the outer case. A metallized layer 211 was provided on a surface of the metal ring 210, coming into contact with a sealing plate 201. Separately, a sealing plate 201 (width 4.5 mm×depth 2.7 mm×height 0.1 mm) serving also as a negative pole current-collecting member and constituted of a covar alloy, containing Co by 19%, Ni by 29%, Mn by 0.4%, Si by 0.1%, C by 0.05% and Fe in the remainder and having a thermal expansion coefficient of $5 \times 10^{-6}/°$ C. (0-300° C.), was given a Ni plating 205. On such negative pole current-collecting member, a negative pole pellet 207 (width 3.8 mm×depth 2.0 mm×height 0.15 mm) utilizing active charcoal as the negative pole active material was adhered with a conductive adhesive 208 containing carbon as a conductive filler, to complete a negative pole unit. A wiring to the positive pole current-collecting member was made by an electrical connection of a conductive pattern A 212, penetrating the wall of the outer case, to a connecting terminal A203, and a wiring to the negative pole current-collecting member was made by an electrical connection of a conductive pattern B 213, penetrating from an upper face of the outer case to the interior of a lateral face, to a connecting terminal B 204. In each of the positive pole unit and the negative pole unit, there was poured an electrolyte liquid formed by dissolving $(C_2H_5)_4NBF_4$ as a supporting salt of a concentration of 1 M in a propylene carbonate solvent. Thereafter the positive pole unit and the negative pole unit were integrated, and a peripheral part of the sealing plate was welded and sealed under a pressure applied by roller-shaped welding electrodes of a parallel seam welding apparatus, whereby an electrical double layer capacitor was completed.

Comparative Example 2

An electrical double layer capacitor was prepared in the same manner as in Example 2, except that the material constituting the negative pole current-collecting member was changed from the covar alloy to an alloy constituted of Ni by 46% and Fe in the remainder and having a thermal expansion coefficient of $4 \times 10^{-6}/°$ C. (0-300° C.). After the electrical double layer capacitors thus prepared were subjected to a charge-discharge test to confirm a charge-discharge capacity. Also measurements were made on the capacity and the internal resistance after they were stored for 1000 hours in an environment of 70° C. under an application of a voltage of 2.5 V. Results of a rate of capacity deterioration from the initial capacity, an internal resistance and an appearance inspection were summarized in Table 1.

TABLE 1

|  | Initial capacity | Capacity deterioration rate (%) | Internal resistance | Liquid leakage |
| --- | --- | --- | --- | --- |
| Example 1 | 1.5 mAh | 10 | 80 | none |
| Example 2 | 0.04 F | 5 | 60 | none |
| Comp. Ex. 1 | 1.3 mAh | 40 | 780 | present |
| Comp. Ex. 2 | 0.04 F | 35 | 500 | none |

Results in Table 1 indicate, in the comparison of Example 1 and Comparative Example 1, that the Comparative Example 1 showed a deterioration in the capacity, an increase in the internal resistance and a liquid leakage, and caused a significant loss in the sealing property by a thermal expansion coefficient higher in the current-collecting member than in the outer case. Also in the comparison of Example 2 and Comparative Example 2, though the absence of liquid leakage in the appearance inspection indicates a satisfactory sealing in both cases, the Comparative Example 2 showed a large deterioration in the capacity and a significant increase in the internal resistance. In contrast, the Example 2 was superior with scarce deterioration in the capacity and scarce increase in the internal resistance. The negative pole current-collecting member, recovered by decomposing the electrochemical cell of the Comparative Example 2, showed porous corrosion in an observation under a SEM, while the Example 2 did not show a corrosion.

The present invention is executed in the embodiments as explained in the foregoing, and provide following effects.

In a chip-type electrochemical cell, by constituting a sealing plate serving also a negative pole current-collecting member with an alloy containing Co by 1 to 50% in weight percentage (wt. %), it is possible to realize a highly reliable electrochemical cell which shows an extremely small deterioration in the performance, such as a loss in the cell capacity or an increase in the internal resistance resulting from a corrosion of the negative pole current-collecting member at a charging or an overdischarge, and which is free from a liquid leakage and shows an extremely small deterioration of the cell performance because of absence of a distortion by a thermal expansion and a contraction of the sealing plate at the welding operation of the cell aperture.

Also the connecting leads of the positive and negative poles for connection with an external circuit are formed by pattern wiring provided on the outer case, so that the connecting terminals can be formed directly on the bottom face of the outer case. It is therefore possible to realize an excellent electrochemical cell not requiring a mounting of tab terminals etc. and capable of achieving a thin and compact structure and a high capacity.

What is claimed is:
1. An electrochemical cell comprising:
   an outer case formed of one of ceramics and glass;
   an electrochemical cell element hermetically sealed in the outer case, the electrochemical cell element containing a positive pole, a negative pole, and a non-aqueous electrolyte containing an organic solvent;

a metal layer formed on an edge of the outer case; and a sealing plate resistance welded to the metal layer, the sealing plate being made of an alloy containing, in weight percentage, Co by 1 to 50%, Ni by 1 to 70%, Fe by 20% or higher, Cr by 10% or lower, Mn by 2.0% or lower, Si by 1.0% or lower and C by 1.0% or lower.

2. An electrochemical cell according to claim 1; wherein the metal layer is made from one of Au and Ni.

3. An electrochemical cell according to claim 1; wherein the sealing plate has a thermal expansion coefficient within a range of $-2$ to $11 \times 10^{-6}/°$ C. (0-3000° C.).

4. An electrochemical cell according to claim 1; further comprising a conductive layer electrically connected with one of the positive pole and the negative pole, and a connecting terminal electrically connected to the conductive layer and formed by patterning on an external surface of the outer case.

5. An electrochemical cell according to claim 1; further comprising a first conductive layer formed on an internal bottom surface of the outer case and electrically connected to the positive pole, a second conductive layer formed on the sealing plate and electrically connected to the negative pole, a first connecting terminal formed by patterning on an external surface of the outer case and electrically connected to the first conductive layer, and a second connecting terminal formed by patterning on the external surface of the outer case and electrically connected to the second conductive layer.

6. An electrochemical cell comprising:

an outer case formed of one of ceramics and glass;

an electrochemical cell element hermetically sealed in the outer case, the electrochemical cell element containing a positive pole, a negative pole, and a non-aqueous electrolyte containing an organic solvent;

a metal ring formed on an edge of the outer case;

a metal layer formed on the metal ring; and a sealing plate resistance welded to the metal layer, the sealing plate being made of an alloy containing, in weight percentage, Co by 1 to 50%, Ni by 1 to 70%, Fe by 20% or higher, Cr by 10% or lower, Mn by 2.0% or lower, Si by 1.0% or lower and C by 1.0% or lower.

7. An electrochemical cell according to claim 6; wherein the metal layer is made from one of Au and Ni.

8. An electrochemical cell according to claim 6; wherein the sealing plate has a thermal expansion coefficient within a range of $-2$ to $11 \times 10^{-6}/°$ C. (0-3000° C.).

9. An electrochemical cell according to claim 6; further comprising a conductive layer electrically connected with one of the positive pole and the negative pole, and a connecting terminal electrically connected to the conductive layer and formed by patterning on an external surface of the outer case.

10. An electrochemical cell according to claim 6; further comprising a first conductive layer formed on an internal bottom surface of the outer case and electrically connected to the positive pole, a second conductive layer formed on the sealing plate and electrically connected to the negative pole, a first connecting terminal formed by patterning on an external surface of the outer case and electrically connected to the first conductive layer, and a second connecting terminal formed by patterning on the external surface of the outer case and electrically connected to the second conductive layer.

11. A method of manufacturing an electrochemical cell, comprising the steps:

disposing a metal layer over an edge of an outer case made of one of ceramics and glass;

disposing a positive pole, a negative pole, and a non-aqueous electrolyte containing an organic solvent in the outer case; and welding a sealing plate to the metal layer by resistance welding, the sealing plate being made of an alloy containing, in weight percentage, Co by 1 to 50%, Ni by 1 to 70%, Fe by 20% or higher, Cr by 10% or lower, Mn by 2.0% or lower, Si by 1.0% or lower and C by 1.0% or lower.

12. A method according to claim 11; further comprising the step of forming a metal ring on the edge of the outer case prior to the step of disposing a metal layer; and wherein the step of disposing a metal layer comprises forming the metal layer on the metal ring.

13. A method according to claim 12; wherein the metal layer is made from one of Au and Ni.

14. A method according to claim 11; wherein the metal layer is made from one of Au and Ni.

* * * * *